United States Patent [19]

Batz et al.

[11] Patent Number: 5,277,926
[45] Date of Patent: Jan. 11, 1994

[54] METHOD OF MAKING A LOW FAT CHEESE PRODUCT

[75] Inventors: Janet Z. Batz, Arlington Heights, Ill.; Timothy A. Mueller, Louisville, Ky.; Rashmi Drummond, Vernon Hills, Ill.

[73] Assignee: Kraft General Foods, Inc., Northfield, Ill.

[21] Appl. No.: 997,683

[22] Filed: Dec. 28, 1992

[51] Int. Cl.$^5$ ............................................. A23C 19/082
[52] U.S. Cl. ..................................... 426/582; 426/578; 426/658
[58] Field of Search .................... 426/582, 578, 658

[56] References Cited

U.S. PATENT DOCUMENTS 3,310,406  3/1967  Webster .............................. 426/582
5,094,873  3/1992  Kerrigan et al. ..................... 426/582

OTHER PUBLICATIONS

Kosikowski, F. 1966, *Cheese and Fermented Foods*, Published by the Author, Distributed by Edwards Brothers, Inc., Ann Arbor, Mich. pp. 296, 299.

*Primary Examiner*—Helen F. Pratt
*Attorney, Agent, or Firm*—Fitch, Even, Tabin & Flannery

[57] ABSTRACT

A method of making a high moisture, low fat processed cheese product, in which a mixture of particulate skim milk curd, salt and an emulsifying salt is first provided. This mixture is heated with agitation to an elevated temperature above about 160° F. to provide a homogeneous cheese blend. An edible acid may be added to the cheese blend. An aqueous wet mix is added to the mixture to provide a high moisture, low fat cheese blend. The wet mix comprises water, a texture modifying agent selected from the group consisting of a maltodextrin, low D.E. corn syrup solids and mixtures thereof and a milk protein source. The wet mix is added to the cheese mixture under conditions whereby the temperature of the blend is maintained above about 130° F. Agitation and heating are continued until the cheese blend reaches a temperature of at least about 190° F. for a period of at least about 90 seconds to provide a high moisture, low fat processed cheese product having at least about 50% moisture.

9 Claims, No Drawings

METHOD OF MAKING A LOW FAT CHEESE PRODUCT

FIELD OF THE INVENTION

The present invention is directed to a low fat processed cheese product and its method of manufacture, and more particularly to a low fat processed cheese product having less than about 1.5% fat, which has the taste, texture and melting properties of conventional processed cheese.

BACKGROUND OF THE INVENTION

Natural cheese is generally made by adding a microorganism to milk which is capable of metabolizing lactose to produce lactic acid and develop acidity. The milk is usually set with a milk clotting enzyme, such as rennet, or by developing acidity to the isoelectric point of the protein. The set milk is cut, whey separates and is recovered from the resulting curd. The curd may be pressed to provide a cheese block and curing takes place over a period of time under controlled conditions. A product having flavor and body characteristics of natural cheese has been made by replacing at least a portion of the animal fat of the milk with vegetable fat and/or by replacing at least a portion of the casein of the milk with a vegetable protein. Such cheeses are referred to as "analog cheese".

Processed cheese is made from one or more varieties of natural cheese, such as cheddar cheese, colby cheese, swiss cheese, washed curd, granular curd cheese, brick cheese and muenster cheese. Processed cheese is made by grinding the natural cheese, combining the particulate cheese with an emulsifying salt and heating it to a temperature sufficient to pasteurize and fluidize the cheese.

There are three general types of processed cheese. These include pasteurized processed cheese, pasteurized processed cheese food and pasteurized processed cheese spread. These processed cheese have certain characteristics which are desirable to cheese consumers. They all have a smooth, creamy texture and a slight firmness which is attributable to the presence of at least 20% fat in the processed cheese formulation.

In the United States, Standards of Identity established by the Food and Drug Administration (FDA) apply to processed cheese. Based on the Standards of Identity, the main differences between the types of processed cheese is their moisture and fat content and the use of optional components.

Processed cheese has a moisture content of not more than 40% and a fat content of not less than 47%. Optional ingredients for pasteurized processed cheese includes an edible acid, cream, water, salt and spices.

Pasteurized processed cheese food generally may include the optional ingredients of pasteurized processed cheese plus other optional ingredients which may include additional dairy ingredients, such as milk, skim milk, whey, buttermilk, skim milk cheese and albumen. It has a much lower fat content. Pasteurized processed cheese food may have a fat content as low as 23%. The moisture content is not more than 44%.

Pasteurized processed cheese spread may include the optional ingredients of pasteurized processed cheese food and may also include a gum. The fat content of pasteurized processed cheese spread may be as low as 20% and it has a moisture content in a range between 44% and 60%.

Processed cheese is made by grinding or mixing while heating one or more cheeses of the same two or more varieties. Processed cheese is heated for no less than thirty seconds at no less than 150° F. These cheeses are made in mass quantities. They are cooked by use of a horizontal cooker, sometimes called a laydown cooker, which can hold up to 500 pounds or more of cheese. Often, the processed cheese is then automatically packaged in air tight cartons.

In recent years, there has been a substantial amount of research effort directed to reducing the amount of fat, particularly saturated fats, in foods. In particular, there is great interest in reducing the level of fat in cheese products, such as processed cheese. It would be highly desirable to develop a processed cheese product with very low levels of fat, but which retains the body, texture, organoleptic properties and meltability of a pasteurized processed cheese food containing at least 23% dairy fat.

To date, most related efforts have been directed to the use of starch and starch gum combinations to replace the caseinate fraction in cheese and other food products.

U.S. Pat. No. 4,552,774 is directed to a cheese-like product containing up to 10% by weight starch which prevents separation during melting.

U.S. Pat. No. 4,499,116 describes imitation cheese products having up to 80% by weight of the caseinate replaced by modified starches containing 15% to 40% by weight amylose. U.S. Pat. No. 4,608,265 and U.S. Pat. No. 4,695,475 describe imitation cheese products having up to 100% replacement of caseinate by modified starches having an amylose content of at least 40%. U.S. Pat. No. 4,937,091 describes an imitation cheese product where up to 100% of the caseinate fraction may be replaced by partially enzymatically debranched starch (amylopectin), a short chain amylose and amylopectin having the texture, thermoreversibility and emulsification characteristics of caseinates found in imitation cheeses.

U.S. Pat. No. 4,847,107 describes a method of preparing fresh cheese in a finely particulate form where the particles are prevented from sticking together by the addition of starch to milled cheese.

U.S. Pat. No. 4,568,555 is directed to a cheese sauce containing various gums to provide shelf stability without the need for refrigeration.

Other patents include U.S. Pat. No. 3,806,606 which describes a synthetic cheese product containing essentially narrow melting range fats, wheat gluten, egg white and gelatin to provide a cheese with the same texture and eating quality of natural cheese.

None of the above-cited patents disclose a processed cheese product having very low fat levels which retains the body, texture, organoleptic properties and meltability of a pasteurized processed cheese food containing at least 23% fat made in accordance with the Standards of Identity of the United States FDA.

Accordingly, it is an object of the present invention to provide a low fat cheese product containing substantially no fat which has the body, texture, firmness, organoleptic properties and melting qualities of processed cheese containing at least 23% dairy fat. It is a further object of the present invention to provide a method for preparing such low fat cheese products. These and other objects of the present invention will become apparent from the following detailed description.

SUMMARY OF THE INVENTION

Generally in accordance with the present invention, high moisture low fat processed cheese products having the same body, texture, organoleptic properties and melting properties of pasteurized processed cheese food having at least 23% fat are provided. In accordance with the method of the invention for manufacture of high moisture, low fat processed cheese product, a mixture of particulate skim milk curd, salt and an emulsifying salt is first provided. This mixture is heated with agitation to an elevated temperature above about 160° F. to provide a homogeneous cheese blend. An edible acid may be added to the cheese blend. An aqueous wet mix is added to the mixture to provide a high moisture, low fat cheese blend. The wet mix comprises water, a texture modifying agent selected from the group consisting of a maltodextrin, low D.E. corn syrup solids and mixtures thereof and a milk protein source. The wet mix is added to the cheese mixture under conditions whereby the temperature of the blend is maintained above about 130° F. Agitation and heating are continued until the cheese blend reaches a temperature of at least about 190° F. for a period of at least about 90 seconds to provide a high moisture, low fat processed cheese product having at least about 50% moisture.

DETAILED DESCRIPTION OF THE INVENTION

The low fat processed cheese product of the present invention is based upon the use of skim cheese curd as the principal component for providing body and texture. Skim milk cheese, however, cannot be processed in the usual manner as are natural cheese products containing fat in the manufacture of processed cheese products which conform to the Standards of Identity of the United States Food and Drug Administration. If skim milk curd is used as the sole component without dilution with water, a dry brittle processed cheese product is produced. If water is added in the formulation, a very soft bodied cheese is produced which does not have texture and body associated with a processed cheese product. In accordance with the present invention, a processed cheese formulation is provided with particular components which can be used in the method of the invention to provide a processed cheese product having the body, texture, organoleptic properties and meltability characteristics of a pasteurized processed cheese food having at least 23% fat. The processed cheese product of the present invention has less than about 1% fat and has more than about 50% water.

In accordance with one process for the manufacture of the skim milk cheese used in the process of the present invention, the skim milk cheese is prepared from a skim milk source which can be selected from skim milk, concentrated skim milk, reconstituted non-fat dry milk or a mixture of any two or more of these with water in a quantity not in excess of that sufficient to reconstitute any concentrated skim milk or non-fat dry milk used to the level of moisture found in whole milk which has had the milk fat separated therefrom, i.e., about 91% moisture. The skim milk source, which may be pasteurized, and which may be warmed is subjected to the action of lactic acid producing bacteria which are either present in the milk or are added thereto. Sufficient rennet or other suitable milk-clotting enzyme is added to the skim milk to set the skim milk to a semi-solid mass. Calcium chloride may also be added in a quantity of not more than 0.02%.

The mass is cut, stirred and heated with continued stirring so as to promote the separation of whey and curd. The whey is drained off and the curd is matted into a cohesive mass. Proteins from the whey may be incorporated into the cheese mass. The mass is cut into slabs which are piled and handled so as to further promote the drainage of whey and the development of acidity. The slabs are then cut into pieces, which may be rinsed by pouring or sprinkling water over them, with free and continuous drainage. The duration of the rinsing is limited so that only the whey on the surface of the curd pieces is removed. The curd is salted, stirred, further drained and pressed into forms. Certain animal or plant enzymes, which are capable of aiding in the curing or development of flavor of the skim milk cheese, may be added during the procedure.

U.S. Pat. No. 4,476,143 to Czulak, et al., U.S. Pat. No. 3,156,568 to Hargove, et al. and U.S. Pat. No. 5,037,659 to Trecker, et al. describe processes for the manufacture of cheese from skim milk. In this connection, the term "skim milk cheese" as used herein is meant a natural cheese prepared from skim milk.

The milk protein source useful in the present invention is selected from the group consisting of bakers cheese, dry curd cottage cheese, non-fat dry milk, evaporated skim milk and skim milk retentate prepared by membrane treatment of skim milk. The milk protein source may have from about 3.5% to about 85% of moisture. Non-fat dry milk has about 3.5-5% moisture. Skim milk retentates may have from 70% to about 80% moisture. Dry curd cottage cheese is a well known dairy product, which is a drained, uncreamed skim milk cheese curd made by inoculating skim milk with a lactic culture and allowing the product to coagulate. Dry curd cottage cheese may also be made by a direct acidification method. Generally, dry curd cottage cheese comprises about 20% to 25% by weight of milk solids not fat and 75% to 85% by weight of water. When used herein, the term "dry curd cottage cheese" refers to a soft cheese curd, such as cottage cheese or bakers cheese curd product having the above solids and moisture characteristics. Concentrated skim milk produced by evaporation or by reconstitution of dried skim milk may also be used. All percentages used herein are by weight unless otherwise indicated.

The skim milk cheese, salt and the emulsifying salt are combined in a suitable apparatus for heating the skim milk cheese. Prior to being heated, the skim milk cheese is preferably comminuted to provide particles of skim milk cheese having a size of from about 1/16 inch to about ⅜ inch. The skim milk cheese is used at a level to provide from about 18% to about 22% milk solids not fat, which is about 68% protein and the milk protein source is used at a level to provide from about 10% to about 15% of milk solids not fat, on a dry solids basis. In combination, the skim milk cheese and the milk protein source are present at levels sufficient to provide from about 18% to about 22% of milk protein. All percentages used herein in reference to the components of the low-fat processed cheese are by weight of the finished cheese product, unless otherwise specified. The skim milk cheese blend is heated to a temperature of from about 170° F. to about 185° F. while the mixture is being agitated. Preferably, the heating is effected in a conventional process cheese laydown cooker wherein heating is effected by steam injection. Heating can also be effected in a jacketed mixer, such as a Groen kettle. Heating to a temperature of 180° F. in the laydown cooker requires a time of from about 1 to about 3 minutes. After a temperature of 180° F. is attained, the skim milk cheese blend has melted and has a smooth homogeneous appearance. An edible acid, such as sorbic acid, is then added to the melted skim milk cheese. The edible acid is used for control of the growth of microorganisms.

A wet mix is then prepared in a separate mixing tank provided with agitation means and a recirculating loop containing a pump. The water is added to the mixing tank and the dry ingredients are added in sequence as the pump recirculates the mixture from the bottom of the mixing tank back to the top. The dry ingredients include a texture modifying agent selected from the group consisting of a maltodextrin or low D.E. corn syrup solids having a DE of from about 22-36 and mixtures thereof and a milk protein source. The wet mix preferably has water present at a level of from about 55% to about 80%. The milk protein source is present at a level sufficient to provide from about 18% to about 35% of milk solids not fat. The corn syrup solids are present in the wet mix at a level of from about 5% to about 9% and the gelling type maltodextrin is present at a level of from about 0.5% to about 2.5%. All percentages being by weight based on the weight of the wet mix. The wet mix is added to the melted skim milk cheese at a level of from about 45% to about 50% by weight based on the final low-fat processed cheese product. Optional flavors and colors may also be present in the wet mix.

The texture modifying component of the processed cheese product of the present invention is an important part of the product. It has been found that the addition of a gelling type maltodextrin or corn syrup solids contributes to a smooth and creamy texture, slight firmness and reduced stickiness. An example of a gelling type maltodextrin is marketed under the tradename Paselli ™ by the Avebe Company of the Netherlands. Paselli ™ is a potato starch enzymatically modified to produce a maltodextrin having a very low DE, below 5. While the level of use of the maltodextrin is very low, this low level of addition of the maltodextrin is critical to providing the desired body, texture and organoleptic properties of the high moisture, low fat processed cheese product of the invention. Corn syrup solids having a DE of from about 22-36 can be used as the sole texture modifying component at a level of from about 3% to about 5%. The maltodextrin is present in the processed cheese product of the present invention at a level of from about 0% to about 1.0%.

The high moisture skim cheese curd is present in the processed cheese product of the invention at a level in the range of from about 42% to about 48%. At higher levels, i.e., at about 51%, many problems are encountered with the processed cheese product of the invention, including restriction of melt properties, loss of creamy texture and increased firmness. At lower levels, a significant loss in body and texture properties occurs.

The total moisture level of the processed cheese product is important. The moisture content is preferably between about 58% and 60%. If the moisture content is below about 50%, melt properties are restricted and increased firmness occurs. If the moisture is greater than 60%, the cheese product becomes too soft to form a loaf, and handling becomes difficult.

The pH range is preferably between about 5.5 and about 5.8. If the pH is less than about 5.5., the melting properties are significantly restricted. Furthermore, the cheese product becomes brittle and has a grainy mouthfeel at pH levels below about 5.5. If the pH is greater than about 5.8, the product becomes too soft to form a loaf and handling and slicing become difficult.

After preparation, the wet mix is added to the heated skim milk cheese in the cooker. The wet mix is added to the cooker under conditions whereby the temperature of the skim milk cheese blend in the cooker is maintained above about 130° F. and preferably within the range of from about 130° F. to about 140° F. If the temperature falls below about 130° F., the blend in the cooker becomes too viscous and handling becomes difficult.

After the cheese mix and the wet mix have been combined in the cooker to provide a low fat cheese blend, the temperature is raised to a level of from about 170° F. to about 175° F. for 5 to 10 seconds. The temperature of the low fat cheese blend is then increased to a final cook temperature of at least about 190° F. and is held at that temperature for a minimum of 90 seconds. The final cooking temperature is very high compared to temperatures normally used in the manufacture of processed cheese formulations containing substantial levels of fat. The high temperature conditions are needed, however, for the low fat processed cheese product of the present invention due to the high level of moisture in the finished product.

After the final cooking temperature has been attained, it is desirable to cool and deaerate the processed cheese by discharging the low fat processed cheese product into a vacuum zone to flash cool and deaerate the low fat processed cheese product. The processed cheese product is then packaged into suitable containers and is stored under refrigeration conditions.

In general, the high moisture, low fat processed cheese product of the present invention has the following components at the indicated levels as set forth in Table 1.

| Component | Level of Use - Wt % |
| --- | --- |
| Skim cheese (44% solids) | 42-48 |
| Added water | 30-35 |
| Total Water | 58-60 |
| Non-fat dry milk (dry basis) | 10-15 |
| Corn syrup solids 22-36 D.E. dry basis | 2-5 |
| Disodium phosphate (dry basis) | 1-2.25 |
| Monosodium phosphate (dry basis) | 0.2-0.35 |
| Salt | 0.75-2.0 |
| Maltodextrin (dry basis) | 0-1.0 |
| Edible acid | 0.05-0.15 |

The following example further illustrates various features of the present invention, but is intended to in no way limit the scope of the invention as set forth in the appended claims.

EXAMPLE

A high moisture, low fat processed cheese was prepared having the following components at the levels indicated in Table 2.

TABLE 2

| Description | % As Is | % Solids |
| --- | --- | --- |
| Skim cheese, 44% Solids | 45.11 | 19.84 |
| Water | 33.0 | |
| Non-fat Dry Milk - 4% Moisture | 13.55 | 13.06 |

TABLE 2-continued

| Description | % As Is | % Solids |
|---|---|---|
| Corn Syrup Solids-24 DE | 3.50 | 3.29 |
| Disodium Phosphate | 2.2 | 1.74 |
| Monosodium Phosphate | 0.32 | 0.28 |
| Salt | 1.10 | 1.10 |
| Paselli SA2, Potato Maltodextrin | 0.50 | 0.46 |
| Cheese Flavor | 0.32 | 0.31 |
| Sorbic Acid | 0.10 | 0.10 |
| Titanium Dioxide, Purified | 0.10 | 0.10 |
| | 100.00 | |
| | Total Solids | 40.28 |

The skim milk cheese was ground to a particle size of about ¼ inch and was added to a laydown cooker with the disodium phosphate and monosodium phosphate. An enzyme modified cheese was added for flavor. The mixture in the laydown cooker was heated to a temperature of 170° F. and was held at that temperature for 1 minute to provide a fluid mass of skim milk cheese. The sorbic acid was then added.

A wet mix was prepared by adding the remaining dry ingredients to the water in a separate mixer provided with a low shear mixer and a recirculating loop. The wet mix was added to the fluid mass of heated cheese in the laydown cooker thereby reducing the temperature of the combined ingredients to about 135° F.

Heating and agitation of the low fat cheese blend in the laydown cooker was continued until the temperature of the cheese blend reached 170° F. The cheese blend was held at that temperature for about 30 seconds. Thereafter, the low fat cheese blend was heated to a temperature of 190° F. and was held at that temperature for a period of 90 seconds to provide a low fat processed cheese product. The low fat processed cheese product, having about 59% moisture, was packaged into suitable containers. After cooling, the low fat processed cheese product was stored under refrigeration conditions. After a period of about 1 weeks storage, the low fat processed cheese product was sampled and found to have a body, texture, organoleptic properties and meltability characteristics similar to a commercially prepared pasteurized processed cheese food.

What is claimed is:

1. A method for manufacture of a low fat processed cheese product comprising:

(a) providing a mixture of particulate skim milk cheese and an emulsifying salt;
 (b) heating said mixture with agitation to an elevated temperature above about 160° F. so as to melt said skim milk cheese;
 (c) adding an aqueous wet mix to said mixture to provide a low fat cheese blend, said wet mix comprising water, a texture modifying agent selected from the group consisting of a gelling type maltodextrin, low DE corn syrup solids and mixtures thereof and a milk protein source, said wet mix being added under conditions whereby the temperature of said blend is maintained above about 130° F.; and
 (d) continuing said agitation and heating until said blend reaches a temperature of at least about 190° F. for a period of at least about 90 seconds to provide a low fat processed cheese product having less than about 1.5% fat.

2. A method in accordance with claim 1 wherein said skim milk cheese is present at a level of from about 42% to about 48% of said low fat processed cheese product.

3. A method in accordance with claim 1 wherein the total moisture of said low fat processed cheese product is from about 58% to about 60%.

4. A method in accordance with claim 1 wherein said skim milk cheese and said milk protein source are present at a level sufficient to provide from about 18% to about 22% of milk protein.

5. A method in accordance with claim 1 wherein a gelling type maltodextrin is present at a level of from about 0.25% to about 1.0%.

6. A method in accordance with claim 1 wherein the low fat processed cheese product has a pH of from about 5.5 to about 5.8.

7. A method in accordance with claim 1 wherein said corn syrup solids has a DE of from about 22 to about 36 and is present at a level of from about 2% to about 5%.

8. A method in accordance with claim 1 wherein said milk protein source is selected from the group consisting of non-fat dry milk, dry curd cottage cheese, baker's cheese, skim milk retentate, evaporated skim milk and reconstituted dried skim milk.

9. A method in accordance with claim 8 wherein said milk protein source is non-fat dry milk.

* * * * *